Aug. 9, 1966 W. C. REDDEN 3,265,188
AUTOMATIC UNLOADING CONVEYOR ASSEMBLY
Filed Oct. 11, 1965 2 Sheets-Sheet 1
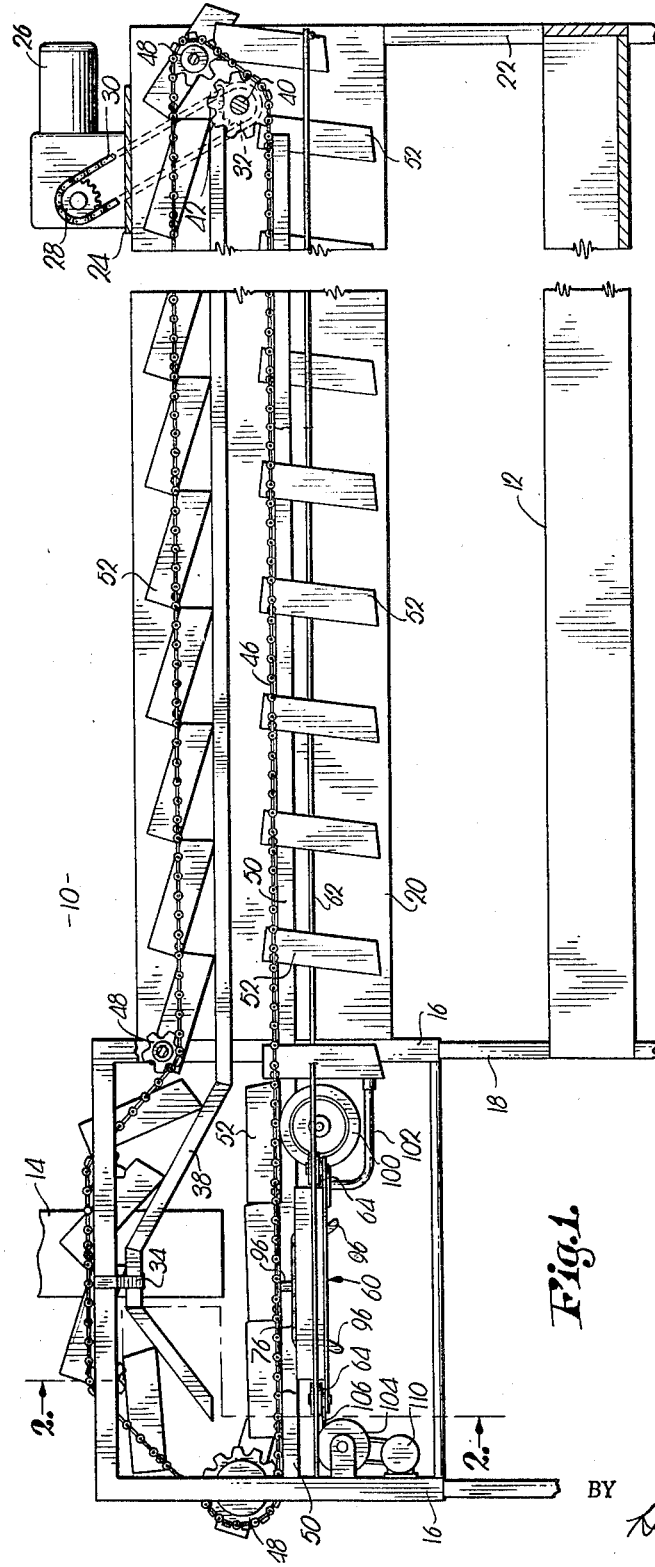
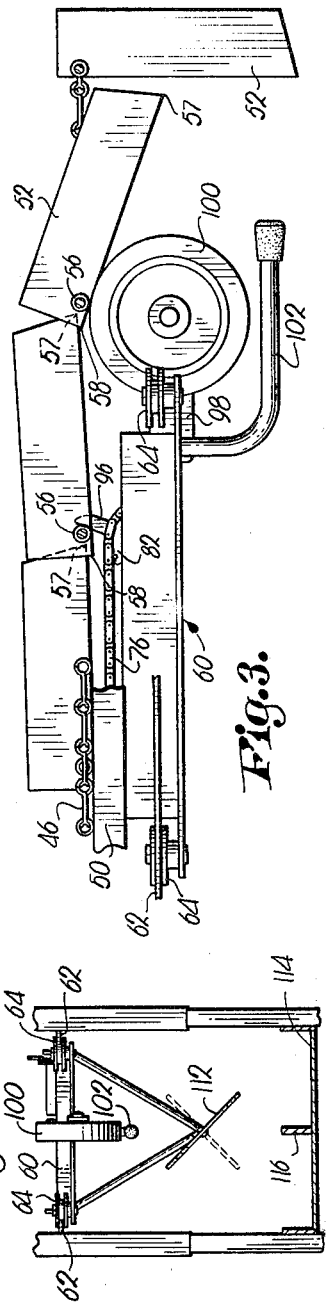
INVENTOR
Warren Clark Redden
BY
Hovey, Schmidt, Johnson & Hovey
ATTORNEYS.

Aug. 9, 1966   W. C. REDDEN   3,265,188
AUTOMATIC UNLOADING CONVEYOR ASSEMBLY
Filed Oct. 11, 1965   2 Sheets-Sheet 2
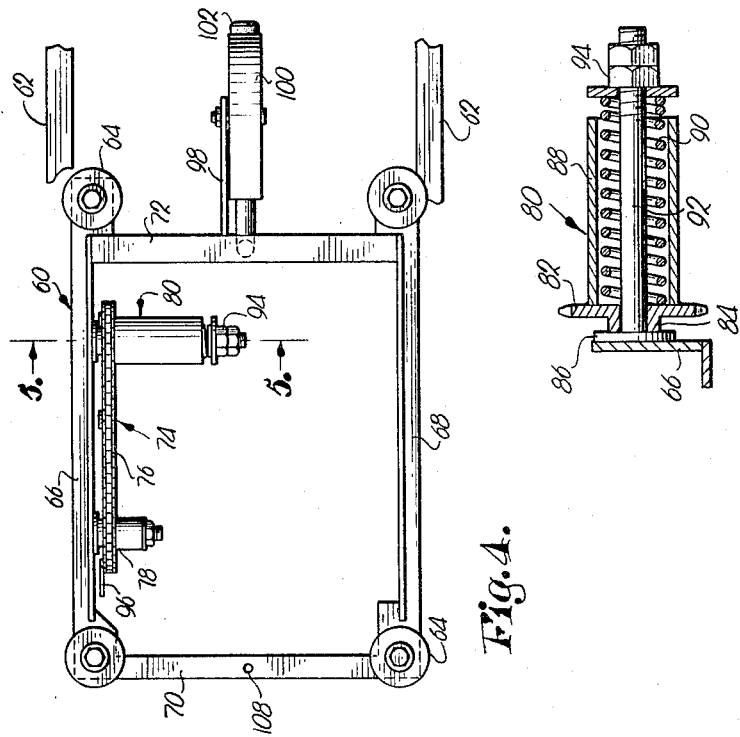
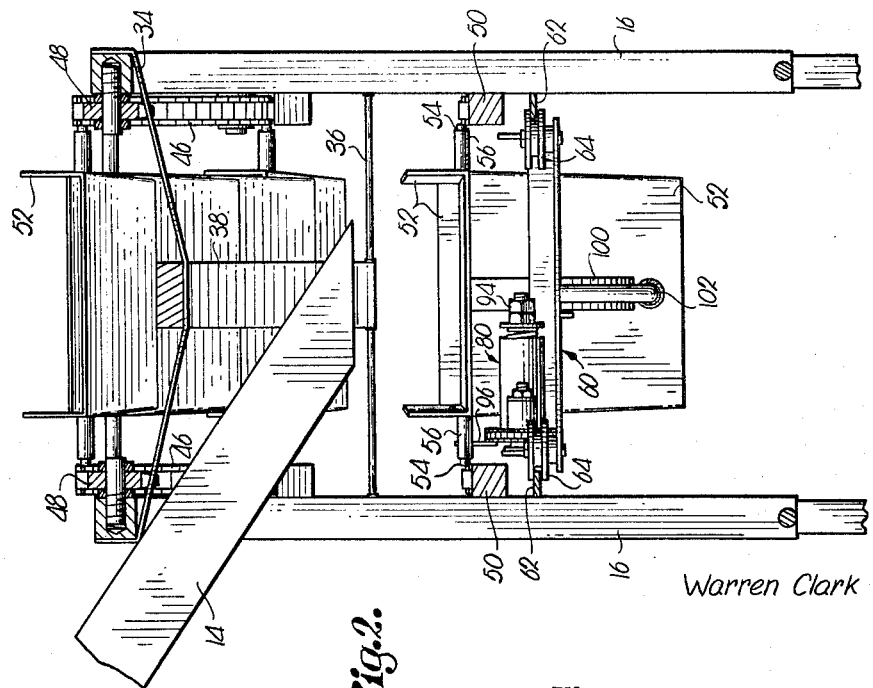
INVENTOR
Warren Clark Redden United States Patent Office 3,265,188
Patented August 9, 1966

3,265,188
AUTOMATIC UNLOADING CONVEYOR ASSEMBLY
Warren Clark Redden, R.F.D., Gypsum, Kans.
Filed Oct. 11, 1965, Ser. No. 494,776
11 Claims. (Cl. 198—146)

This is a continuation-in-part of my copending application Serial No. 376,955, filed June 22, 1964, and relates generally to conveyor apparatus for transporting and unloading materials, and more specifically, to apparatus particularly adapted for distributing livestock feed from a silo or grain bulk bin to a feed trough.

It is the primary object of this invention to provide apparatus for distributing livestock feed or other materials having a higher level of efficiency than is usually found in auger-type distributing mechanisms. Since it is necessary for an auger to drag or churn through the material to be distributed, a relatively high power requirement is inherent in a device of this type and the problem of contamination, in the case of livestock feeds, may exist because of the presence of lubricants.

It is another important object of this invention to provide livestock feed distributing apparatus which will load the feed trough or bunk in a manner to prevent crowding of the livestock and "hogging" of the feed by boss animals.

Still another important object of the instant invention is to provide apparatus capable of distributing all types of chopped feeds or grains including silage, hay and hay wafers without damage and without separating mixed feeds during distribution.

Yet another important object of this invention is to provide feed distribution apparatus which minimizes blowing of the feed in high winds during distribution thereof.

Specifically, it is an important aim of the instant invention to provide conveyor apparatus having a series of material-carrying trays which are supported, during advancement to a dumping location, by a shiftable carriage underlying the lead tray which is selectively shiftable in a direction opposite to the direction of conveyor movement to successively dump the trays when the same are in overlying relationship to the dumping location.

In the drawings:

FIGURE 1 is a side elevational view of the apparatus, certain parts thereof being broken away for clarity;

FIG. 2 is a vertical, sectional view taken along line 2—2 of FIG. 1;

FIG. 3 is an enlarged, fragmentary, side elevational view showing the action of the dumping device;

FIG. 4 is a plan view of the dumping device;

FIG. 5 is an enlarged, sectional, detailed view taken along line 5—5 of FIG. 4; and FIG. 6 is a fragmentary view showing a modified form of the dumping device in front elevation.

FIGURE 1 shows a conveyor assembly 10 disposed in operational relationship to a feed trough or bunk 12. A loading spout 14 is illustrated adjacent the left end of assembly 10, it being understood that spout 14 may lead directly from a silo or grain bin or be associated with a loading and mixing auger.

In FIGS. 1 and 2, a pair of juxtaposed, generally rectangular frames 16 are shown supported by standards 18, and define the loading area of the apparatus. Forwardly of this area, to the right as viewed in FIG. 1, a pair of side walls 20 extend horizontally and are supported by frames 16, standards 18, and another set of standards 22 (one of the walls 20 is broken away for clarity).

A platform 24 is mounted atop side walls 20 and supports a prime mover 26 coupled with a drive sprocket 28, a drive chain 30, and a driven sprocket 32. A bracket 34 and a cross member 36 spanning the distance between frames 16 carries a support rail 38 which extends horizontally between side walls 20. A shaft 40 is journalled in side walls 20 and serves to mount driven sprocket 32 and a pair of conveyor drive sprockets 42 (one being shown).

A pair of endless conveyor chains 46 are trained over corresponding drive sprockets 42 and a number of idler sprockets 48. A pair of tracks 50 extend horizontally throughout substantially the entire length of the apparatus, each track 50 being rigid with a corresponding frame 16 in the loading area, and secured to side walls 20 in the delivery portion of the assembly. The lower, horizontal stretches of chains 46 overlie tracks 50, are supported thereby, and ride thereon during driving of the conveyor chains.

An endless series of trays 52 is carried by chains 46, each tray 52 being of transversely U-shaped, open-ended configuration as is clearly illustrated in FIG. 2. Opposed hinge pins 54 are rigid with chains 46 and extend toward one another into operative association with correponding hinge barrels 56 rigid with trays 52. As is clearly revealed in FIG. 3, each tray 52 has a leading extremity 57 and a trailing extremity 58, and is provided with a pair of opposed hinge barrels 56 adjacent its trailing extremity 58. The direction of movement of the trays during operation of the conveyor chains is illustrated by the arrow in FIG. 3; the direction of movement of the conveyor in FIG. 1 is counterclockwise, the lower stretch moving rightwardly and the upper stretch moving leftwardly.

A carriage 60 in the form of an open, rectangular frame is mounted between the lower stretches of chains 46 and spaced therebelow, on a pair of horizontal guides 62 which define a plane extending in parallelism to the horizontal plane defined by the lower stretches of claims 46. Carriage 60 is provided with a grooved wheel 64 at each of its four corners, the pair of wheels 64 on each side of the carriage receiving a corresponding guide 62 (FIG. 2). The carriage structure comprises a pair of parallel angle members 66 and 68 defining the sides thereof, and a pair of crosspieces 70 and 72 which present the trailing and leading edges of the carriage structure, respectively.

A tension release mechanism 74 is mounted on angle member 66 and comprises a link chain 76 trained around a free-wheeling sprocket assembly 78 and a friction drag sprocket assembly 80. Assembly 80 (FIG. 5) comprises a sprocket 82 having a hub 84 engaging a bearing plate 86 rigid with angle member 66, a coaxial sleeve 88 rigid with sprocket 82 and receiving a coil spring 90, and a stationary axle 92 rigid with member 66 and extending axially through sleeve 88 as illustrated. The outer end of axle 92 is threaded into a nut and washer tension adjustment 94 which maintains spring 90 under compression to a desired degree.

Chain 76 is provided with three outwardly extending fingers 96, the finger of the upper stretch of chain 76 extending upwardly into a position where the same is engageable by one of the hinge barrels 56 of an adjacent tray 52. The distance along chain 76 between adjacent fingers 96 is slightly less than the spacing between corresponding hinge barrels 56 of adjacent trays 52.

Crosspiece 72 is provided with a forwardly extending mounting plate 98 which carries a rubber-tired wheel 100 rotatable about a horizontal axis extending in perpendicular relationship to the path of travel of the conveyor chains 46. Wheel 100 normally bears against and supports the tray 52 directly thereabove. A bumper bar 102 also projects forwardly from the crosspiece 72 and, as illustrated, extends beneath wheel 100 to a position slightly ahead of the wheel.

A winch 104 (FIG. 1) is mounted on frame 16 at the left end of conveyor assembly 10 and has a cable 106 connected to the center of crosspiece 70, as at 108 (FIG. 4). An electric motor 110 is operably coupled with winch 104 to drive the latter in a direction to reel cable 106 thereupon, thereby shifting carriage 60 to the left along guides 62.

FIGURE 6 illustrates an additional component in the form of a diverter board 112 which may be suspended from carriage 60 when the instant invention is utilized with a bunk 114 having a central divider 116. Board 112 is disposed ahead of wheel 100 and bumper bar 102 and, as illustrated by the broken lines, board 112 is selectively positionable so that material dropping thereon may be directed to a selected half of bunk 114 depending upon the desires of the operator.

In FIG. 1 the trays 52 on the lower stretch of the conveyor in the left portion of the figure are shown in their material-carrying dispositions, while the lower trays in the central and right portions of the figure are illustrated in their material-dumping dispositions. The left-hand trays of the lower stretch receive livestock feed from spout 14 as the trays move horizontally past the spout upon operation of prime mover 26. The loaded trays are carried by conveyor chains 46 to a dumping location, in this case directly over feed trough 12.

By way of illustration, it is assumed that the components of the apparatus are initially in the positions shown in FIG. 1 and that it is desired to transport feed along the conveyor to a position where dumping of the trays will effect uniform filling of trough 12 along its entire length. To commence the operation, motor 110 controlling winch 104 is deenergized to permit the winch to unreel cable 106. Prime mover 26 is placed in operation and a loading auger or the like (not shown) is activated in order to discharge feed from spout 14.

As the trays 52 advance, carriage 60 moves therewith by engagement of the hinge barrel 56 of the tray 52 directly over mechanism 74 with one of the fingers 96. This maintains wheel 100 in supporting relationship to the preceding tray 52. The engaged finger 96 remains stationary with respect to trays 52 because of the pressure of spring 90 against sprocket 82 which maintains the same in engagement with bearing plate 86 under sufficient force to prevent slippage of sprocket 82.

Since one of the trays 52 is supported by wheel 100, the trays therebehind are also maintained in their material-carrying dispositions because of the mutual support provided by an overlapping of the leading and trailing extremities of adjacent trays. This is particularly clear in FIG. 3 where it may be seen that the left-hand tray is held in a substantially horizontal attitude by slight overlapping of its leading extremity 57 and the trailing extremity 58 of the preceding tray. Since hinge barrels 56 are located adjacent the trailing extremity 58 of each tray, the trays will immediately swing to vertical, material-dumping dispositions when the leading extremity is no longer supported.

Dumping of the trays is effected in a successive manner when the leading tray reaches a position directly above the most remote point of the dumping location. In the instant example, it is assumed that this point is near the right-hand end of trough 12. Thus, the leading loaded tray and carriage 60 will be shifted by conveyor chains 46 to a position adjacent the right-hand end of the conveyor before dumping is effected, but it should be understood that the dumping operation may be accomplished by commencing at any point along the path of travel of the lower stretch of chains 46 between the loading area and the right-hand end of the conveyor.

When the leading tray 52 reaches the remote dumping point mentioned above, the operator energizes motor 110 to activate winch 104 and reel cable 106. The compression of spring 90 is set such that operation of winch 104 will shift carriage 60 leftwardly (opposite to the direction of movement of the conveyor), the sprocket 82 now rotating under the force applied thereto by sequential engagement of fingers 96 with the hinge barrels 56 of the advancing trays. As each finger 96 moves out of engagement with a particular hinge barrel 56, the next finger moves to the upper stretch of chain 76 and is engaged by the barrel 56 of the following tray. This action is illustrated in FIG. 3 where it may be seen that sprocket 82 is now forced to rotate and wheel 100 is shifted from beneath trays 52 one at a time. Thus, successive dumping of the trays is accomplished and will continue until winch 104 is deactivated, thereby once again frictionally locking sprocket 82.

The empty trays 52 are carried by the upper stretches of chains 46 back to the loading area, support rail 38 being configured in a manner to present the trays in a horizontal, mutually supported attitude as the trays once again enter the lower stretch of the conveyor at the loading area. In normal usage, carriage 60 is returned by winch 104 until it overlies the dumping point nearest the loading area, whereupon the winch is again released and the operation repeated until the desired quantity of feed is dumped into trough 12. Thus, the operational cycle is continuous and may readily be automatically controlled, if desired, to effect continuous resupply of trough 12.

Having thus described the invention, what is claimed as new and desired to be secured by Letters Patent is:

1. Apparatus for transporting and unloading materials comprising:
   conveyor means adapted for advancement in a predetermined direction;
   at least a pair of material-receiving tray structures each having opposed, leading and trailing extremities;
   means supporting the trailing extremity of each of said structures and coupling the latter to said conveyor means for advancement therewith and for movement of each structure between a material-carrying disposition and a material-dumping disposition;
   the leading structure of said pair of structures having means engageable with the leading extremity of the other of said pair of structures, when said leading structure is in its material-carrying disposition, for supporting said other structure and maintaining the same in its material-carrying disposition;
   a device movable with said leading structure during operation of said conveyor means for supporting said leading structure in the material-carrying disposition thereof as the structures are advanced by the conveyor means, whereby said other structure is maintained in its material-carrying disposition by the leading structure; and
   control means coupled with said device for effecting relative movement of said structures and said device to release said leading structure for movement to its material-dumping disposition and substantially simultaneously position said device in supporting relationship to said other structure, and then release said other structure for movement to its material-dumping disposition, whereby said structures are successively dumped upon operation of said control means.

2. The invention of claim 1; and
   means mounting said device for movement along a path of travel extending in substantial parallelism to said conveyor means,
   said device being provided with means for releasably coupling the device with one of said structures to thereby shift the device therewith,
   said control means being operable to effect release of said releasable coupling means to permit said relative movement of said structures and said device.

3. The invention of claim 1,
   said conveyor means being generally horizontally disposed; and
   means mounting said device beneath said conveyor means in a position for supporting the structure thereabove.

4. The invention of claim 3,
   said trailing extremity supporting means mounting said structures for gravitational movement of each structure from its material-carrying disposition to its material-dumping disposition, said means engageable with the leading extremity of said other structure comprising a portion of said leading structure adjacent the trailing extremity thereof and movable therewith from a position in underlying relationship to the leading extremity of said other structure to a position clearing the other structure during movement of the leading structure from its material-carrying disposition to its material-dumping disposition.

5. The invention of claim 3, said mounting means defining a path of travel for said device extending in substantial parallelism to said conveyor means, said control means being operable to shift said device along said path in a direction opposite to the direction of advancement of said conveyor means, whereby to cause said relative movement of said structures and said device.

6. The invention of claim 5, said device comprising a carriage movable along said path and having a structure-engaging support, said carriage being provided with releasable mechanism engageable by one of said structures for coupling the carriage therewith, said control means being coupled to said carriage, said mechanism operating to release the carriage from said one structure in response to application of a predetermined force to said carriage by said control means in said opposite direction.

7. The invention of claim 5, said device comprising a carriage movable along said path and having a structure-engaging support, said carriage being provided with a selectively positionable material diverter disposed therebelow ahead of said support for directing dumped material to either side of said path of travel.

8. Apparatus for transporting and unloading material comprising:

endless conveyor means adapted for advancement of a stretch thereof in a predetermined direction;

a series of material-receiving tray structures each having opposed, leading and trailing extremities;

means supporting the trailing extremity of each of said structures and coupling the latter to said conveyor means for advancement therewith and for movement of each structure between a material-carrying disposition and a material-dumping disposition, each structure having means engageable with the leading extremity of the following structure, when the preceding structure is in its material-carrying disposition, for supporting said following structure and maintaining the same in its material-carrying disposition;

a device movable with one of said structures during operation of said conveyor means for supporting said one structure in the material-carrying disposition thereof as the structures are advanced by the conveyor means, whereby the structures following said one structure support one another in their material-carrying dispositions; and control means coupled with said device for effecting relative movement of said structures and said device to release said one structure for movement to its material-dumping disposition and substantially simultaneously position said device in supporting relationship to the structure therebehind, and then successively release the structures following said one structure for movement to their material-dumping dispositions.

9. The invention of claim 8; and means mounting said device for movement along a path of travel extending in substantial parallelism to said stretch, said device being provided with means for releasably coupling the device with any of the structures of said stretch in supporting relationship to a selected structure, whereby the device moves with said selected structure upon advancement of said conveyor means, said control means being operable to effect release of said releasable coupling means to permit said relative movement of said structures and said device, whereby the device supports said selected structure until operation of said control means.

10. The invention of claim 9, said device comprising a carriage movable along said path and having a structure-engaging support, said releasable coupling means including mechanism on the carriage engageable by a proximal structure of said stretch for movement thereby as the conveyor means advances whereby, following operation of said control means to release said coupling means and selectively position said device with respect to said structures, said proximal structure engages said mechanism upon advancement of said conveyor means to move the device with the advancing structures to maintain the same in their material-carrying dispositions until dumping thereof is desired.

11. The invention of claim 10, said control means being coupled to said carriage and including a winch for shifting the device along said path in a direction opposite to the direction of advancement of said stretch, said mechanism comprising a chain and sprocket assembly, means coupled with one of the sprockets of said assembly for normally holding said one sprocket in a stationary position with respect to said carriage, and a plurality of fingers extending from said chain and engageable by said trays for coupling the carriage therewith for movement thereby, said holding means operating to release said one sprocket in response to application of a predetermined force to said carriage by said control means in said opposite direction, whereby the chain and sprocket assembly is driven by engagement of the trays with successive fingers as the trays and the carriage shift relative to each other.

References Cited by the Examiner

UNITED STATES PATENTS

| 880,091 | 2/1908 | Paton | 198—146 X |
|---|---|---|---|
| 1,620,268 | 3/1927 | McVicker | 198—146 |
| 1,768,534 | 7/1930 | Aiken | 198—155 |

EVON C. BLUNK, *Primary Examiner.*

R. E. KRISHER, *Assistant Examiner.*